UNITED STATES PATENT OFFICE.

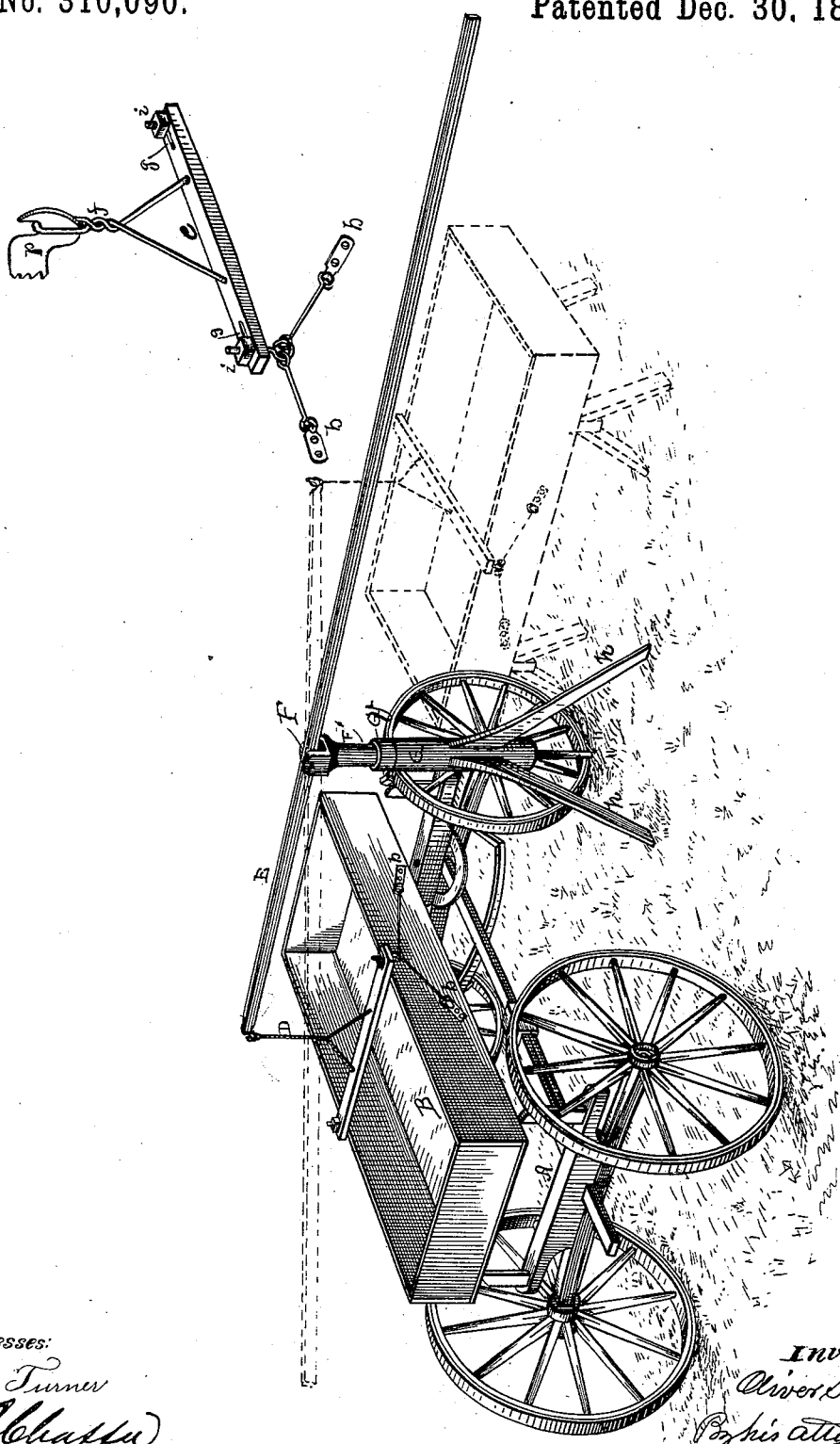

OLIVER SLAGLE, OF GREENFIELD, OHIO.

WAGON-BODY LIFTER.

SPECIFICATION forming part of Letters Patent No. 310,090, dated December 30, 1884.

Application filed November 14, 1884. (No model.)

*To all whom it may concern:*

Be it known that I, OLIVER SLAGLE, of Greenfield, Highland county, Ohio, have invented new and useful Improvements in Body-Lifters; and I do hereby declare that the following is a full and accurate description of the same.

Every farmer has frequent occasion to remove the body or box from the running-gear of his wagon, and without mechanical aid it is practically impossible for a man to do so single-handed. Therefore several contrivances have been devised for the purposes of facilitating such removal; but, so far as I am aware, none of them possess desirable portability and simplicity.

My invention consists of a simple lever fulcrumed upon and vertically pivoted to the top of a movable stand or post, and attached to one end of said lever a grapple, whereby the wagon box or body may be attached to the free end of the lever and then lifted off and free from the running-gear of the wagon, and while so suspended swung or carried around and deposited upon the ground, or upon some means for its support—say upon trestles or the like.

That others may fully understand my invention, I will particularly describe it, having reference to the accompanying drawing, wherein the figure is a perspective view of my invention in operation.

A is the wagon running-gear, and B is the body or box, of ordinary structure. It is convenient and desirable, however, to provide and attach to each side of the wagon-box two hooks or rings, b, though the grapple-iron D, with its grapple-rods q, may be made so as to hook under the bottom of the body, if preferred. The use of the rings or hooks b entirely prevents liability of accident from the grapple slipping off, and thus permitting the body to fall to the ground.

The grapple D may be constructed in a great variety of ways without varying its mode of action, which is well understood, and therefore the constructer may vary the form as he desires. The form shown is, however, preferred by me. The grapple D is attached to a long lever, E, at or near its free end. At a point—say one third the length of the lever from its grapple end—I place a swivel or pivoted fulcrum, F, which swivels or turns on the top of the standard or post G, which is conveniently provided with legs h, so that the whole apparatus may be easily transported and put in position by the side of the wagon the body of which is to be raised. When placed in proper position, the grapple D is attached to the rings or hooks b. The operator then applies his force to the opposite end of the lever, and thereby lifts the body away from the running-gear, as shown in the drawing. When so lifted off and away from the running-gear, the whole may be carried or swung around upon the pivotal connection with the post G, and finally deposited upon the ground, or upon trestles or the like, as shown in dotted lines. When desired, the body B may be replaced upon the running-gear by movements the reverse of those above mentioned.

The above is a general description of my invention.

I prefer to construct my grapple with a rigid bar, e, to which the loop f is rigidly attached. The bar e is provided at its ends with slots g g and screw-eye bolts i i, whereby the bar e may be clamped fast to the wagon-body and the loop f adjusted more or less toward one side to cause the body to balance perfectly when suspended from the lever E. The loop f is elongated, and the suspending-hook p is made very wide and adapted to fit said loop, so that while suspended from said hook the body will be restrained from a pivotal motion on the point of suspension and will be completely controlled by the lever E.

As it is frequently desirable to vary the height of the fulcrum to adapt it to wagons of different heights, I propose sometimes to make the pivot-pin F' long enough to permit it to be raised or lowered in the tubular post G, as may be required; and to this end it is convenient to make F' of gas-pipe, as that will secure the greatest stiffness and least weight; and in order that it may be supported at any height and still turn freely, I place on said pivot a collar, q, provided with a set-screw or other means of clamping it fast to the pin F', and said collar rests upon the top of the post G and forms the bearing for the pivot, at whatever point on said pivot said collar may be fixed.

I claim as new—

1. The lever E, mounted upon the swiveled fulcrum F, and provided with the grapple D, combined with the portable fulcrum-post G, substantially as and for the purpose set forth.

2. The lever E, mounted upon the post G by means of the swivel-fulcrum F, combined with the grapple D, and the wagon-body B, provided with the hooks or rings $b$, substantially as set forth.

3. The lever E, mounted upon the post G by means of swiveled fulcrum F, combined with a grapple, D, provided with an adjustable bar, $e$, whereby the point of suspension may be shifted laterally and clamped fast to the wagon-body, balanced and controlled as set forth.

4. The grapple D, provided with the adjustable bar $e$, having slots $g$, the screw-eyes $i\ i$ in said slots, the grapple-rods $q\ q$, and elongated loop $f$, combined with the lever E, provided with a swiveled fulcrum, F, and a flattened hook, $p$, adapted to fit said loop and thereby restrain any pivotal motion of the wagon-body upon its point of suspension.

5. The lever E, provided with the grapple D and hook $p$, fitted to each other so as to restrain the wagon-body from pivotal motion on said hook, combined with the post G and the cylindrical pivot-pin F, provided with the adjustable collar $q$, and the fulcrum F, as and for the purpose set forth.

OLIVER SLAGLE.

Witnesses:
S. C. MURRAY,
S. M. STRAIN.